(12) United States Patent
Yakabe et al.

(10) Patent No.: US 7,296,563 B2
(45) Date of Patent: Nov. 20, 2007

(54) INTERNAL COMBUSTION ENGINE INTAKE DEVICE

(75) Inventors: Yoshinori Yakabe, Yokohama (JP); Junya Sasaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 10 days.

(21) Appl. No.: 11/483,537

(22) Filed: Jul. 11, 2006

(65) Prior Publication Data

US 2007/0006856 A1 Jan. 11, 2007

(30) Foreign Application Priority Data

Jul. 11, 2005 (JP) ............................. 2005-202163

(51) Int. Cl.
*F02M 25/07* (2006.01)
*F02M 25/06* (2006.01)

(52) U.S. Cl. ............ 123/568.17; 123/572; 123/184.24; 123/184.26

(58) Field of Classification Search ........... 123/184.24, 123/184.26, 572, 568.17, 568.11

See application file for complete search history.

(56) References Cited

U.S. PATENT DOCUMENTS 6,272,851 B1 * 8/2001 Mori et al. .................... 60/278
6,805,087 B2 * 10/2004 Yakabe et al. ......... 123/184.25
7,089,921 B2 * 8/2006 Matsuoka et al. .......... 123/572

FOREIGN PATENT DOCUMENTS

JP 2001-140713 5/2001

\* cited by examiner

*Primary Examiner*—Stephen K. Cronin
*Assistant Examiner*—Arnold Castro
(74) *Attorney, Agent, or Firm*—Global IP Counselors, LLP

(57) ABSTRACT

An internal combustion engine intake device is configured to suppress the occurrence of freezing in a portion thereof where blow-by gas or another gas is introduced into an intake passage. The intake device basically has a throttle chamber, an intake air collector, an air induction pipe, a partitioning part, a gas introducing pipe and a volume chamber. The air induction pipe is provided between the throttle valve and the intake air collector. The partitioning part divides the space inside the air induction pipe into first and second air induction spaces. The gas introducing pipe introduces the blow-by gas into the first and second air induction spaces directly. The blow-by gas contains moisture and has a higher temperature than the fresh air in the first and second air induction spaces. The volume chamber is arranged between the gas introducing pipe and the first and second air induction spaces.

19 Claims, 7 Drawing Sheets

INTERNAL COMBUSTION ENGINE INTAKE DEVICE

CROSS-REFERENCE TO RELATED APPLICATIONS

This application claims priority under 35 U.S.C. § 119 to Japanese Patent Application No. 2005-202163. The entire disclosure of Japanese Patent Application No. 2005-202163 is hereby incorporated herein by reference.

BACKGROUND OF THE INVENTION

1. Field of the Invention

The present invention relates to an intake device for an internal combustion engine.

2. Background Information

In the past, there have been several proposals (e.g., Japanese Laid-Open Patent Publication No. 2001-140713 (pages 1 to 3, FIGS. 1 to 7)) for an intake device that introduces blow-by gas or another gas into an intake passage.

In view of the above, it will be apparent to those skilled in the art from this disclosure that there exists a need for an improved internal combustion engine intake device. This invention addresses this need in the art as well as other needs, which will become apparent to those skilled in the art from this disclosure.

SUMMARY OF THE INVENTION

It has been discovered that in some of these conventional intake devices, the portion of the intake passage between the throttle valve and the intake air collector is divided into a first air induction space and a second air induction space by a partitioning plate. In such intake devices, blow-by gas or another gas is sometimes introduced into the first air induction space and the second air induction space either from the side of the partitioning plate or from above and below the partitioning plate. Freezing may occur at the portion where the gas is introduced into the intake passage.

One object of the present invention is to provide an intake device that can suppress the occurrence of freezing in the portion thereof where blow-by gas or another gas is introduced into the intake passage.

In order to achieve the above mentioned object and other objects of the present invention, an internal combustion engine intake device is provided that basically comprises a regulating chamber, an intake air collector, an air induction pipe, a partitioning part, a gas introducing pipe and a volume chamber. The regulating chamber has a regulating valve configured and arranged to regulate a quantity of fresh air flowing therethrough. The intake air collector fluidly communicates with the regulating chamber at a position downstream of the regulating valve. The air induction pipe is arranged between the regulating valve and the intake air collector to communicate the fresh air from the regulating chamber to the intake air collector. The air induction pipe includes a partitioning part arranged and configured to divide a space inside the air induction pipe into a first air induction space and a second air induction space. The gas introducing pipe is configured and arranged to introduce a first gas into the first and second air induction spaces. The first gas is different from the fresh air. The volume chamber is arranged between the gas introducing pipe and the first and second air induction spaces such that the first gas passes from the gas introducing pipe through the volume chamber and into the first and second air induction spaces.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overview of Structure of Internal Combustion Engine

Figure 1:
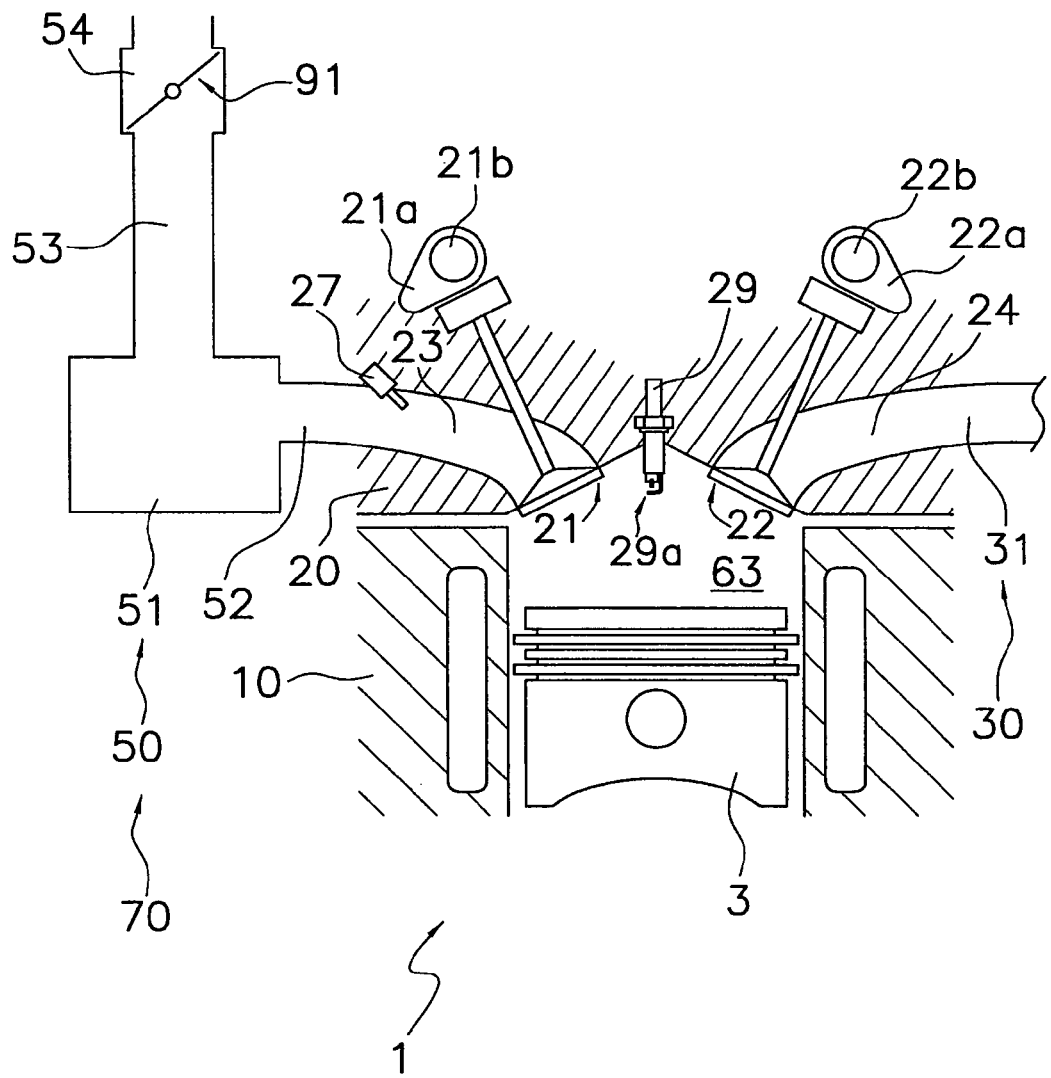
FIG. 1 is a schematic view of an internal combustion engine intake device in accordance with one embodiment of the present invention.

Referring initially to FIG. 1, an internal combustion engine 1 is schematically illustrated in accordance with a first embodiment of the present invention. The internal combustion engine 1 is, for example, a conventional V6 engine configured to execute air intake that utilizes resonance. The engine 1 is preferably mounted transversely inside an engine compartment at the front of a vehicle (i.e., a crankshaft (not shown) of the engine 1 is oriented to extend in a transverse direction of the vehicle). In the conventional V6 engine, the six cylinders are divided into a right-hand bank located on the right-hand side and a left-hand bank located on the left-hand side when the engine 1 is viewed from the lengthwise direction. Each cylinder bank has the same number of cylinders.

The engine 1 includes six combustion chambers 63 (only one combustion chamber 63 is shown in FIG. 1), an intake device 70, an exhaust device 30, six fuel injection valves 27 (only one fuel injection valve 27 is shown in FIG. 1), and six spark plugs 29 (only one spark plug 29 is shown in FIG. 1).

The combustion chamber 63 of each cylinder is defined by a cylinder head 20, a cylinder block 10, and a piston 3 as shown in FIG. 1. The cylinder head 20 has a plurality of intake ports 23 (only one intake port 23 is shown in FIG. 1) for supplying fresh air to the combustion chambers 63 and a plurality of exhaust ports 24 (only one exhaust port 24 is shown in FIG. 1) for discharging burned gas from the combustion chambers 63 as exhaust gas.

The intake device 70 is configured and arranged to guide fresh air and fuel to each of the combustion chambers 63 through an intake passage 50. A common intake device 70 serves all six of the cylinders. The intake device 70 includes a plurality of intake valves 21 (only one intake valve 21 is shown in FIG. 1), the intake ports 23, and a plurality of runners or intake branches 52 (only one intake branch 52 is shown in FIG. 1). The intake branches 52 are positioned upstream of the intake ports 23. The intake valves 21 are arranged at the downstream ends of the intake ports 23.

The exhaust device 30 is configured and arranged to discharge exhaust gas from the combustion chambers 63. The exhaust device 30 is connected to all six cylinders. The exhaust device 30 includes a plurality of exhaust valves 22 (only one exhaust valve 22 is shown in FIG. 1), the exhaust ports 24, and a plurality of exhaust branches 31 (only one exhaust branch 31 is shown in FIG. 1). The exhaust branches 31 are positioned downstream of the exhaust ports 24. The exhaust valves 22 are arranged at the upstream ends of the exhaust ports 24.

An intake camshaft 21b has a plurality of intake cams 21a (only one intake cam 21a is shown in FIG. 1) fixed thereto. The intake cams 21a are arranged such that the intake cams 21a are positioned above the intake valves 21. The intake camshaft 21b is arranged such that it rotates when the crankshaft of the engine 1 rotates. When the intake camshaft 21b rotates, the intake cams 21a cause the intake valves 21 to open and close. Likewise, an exhaust camshaft 22b having a plurality of exhaust cams 22a (only one exhaust cam 22a is shown in FIG. 1) fixed thereto is arranged such that the exhaust cams 22a are positioned above the exhaust valves 22. The exhaust camshaft 22b is arranged such that it rotates when the crankshaft of the engine 1 rotates. When the exhaust camshaft 22b rotates, the exhaust cams 22a cause the exhaust valves 22 to open and close.

One fuel injection valve 27 is provided with respect to each cylinder and each fuel injection valve 27 serves to inject fuel (gasoline) into the respective intake port 23. The tip end of the fuel injection valve 27 protrudes into the combustion chamber 63.

One spark plug 29 is provided with respect to each cylinder. Each spark plug 29 is arranged to extend into the respective one of the combustion chambers 63 from a portion of the cylinder head 20 that is positioned above the approximate center of the combustion chamber 63. The tip end portion 29a of the spark plug 29 protrudes into the combustion chamber 63.

Overview of Operation of Internal Combustion Engine

In the internal combustion engine 1, fresh air introduced into the intake branches 52 is guided to the intake ports 23 as a second air mixture (described later). Pressurized fuel supplied to the fuel injection valves 27 is injected into the fresh air guided into the intake ports 23. As a result, a mixture of fresh air and fuel is formed in the intake ports 23.

In the intake stroke of any given cylinder, the intake valve 21 is opened by the intake cam 21a and the mixture of fresh air and fuel formed in the intake port 23 is introduced into the combustion chamber 63 from the intake port 23.

During the compression stroke, the piston 3 rises and the mixture of fresh air and fuel inside the combustion chamber 63 is compressed. Then, at a prescribed timing, the tip end portion 29a of the spark plug 29 ignites the mixture of fresh air and fuel (air-fuel mixture) inside the combustion chamber 63, thereby causing the air-fuel mixture to combust.

During the power stroke, the combustion pressure generated by the combustion of the mixture of fresh air and fuel pushes the piston 3 downward.

During the exhaust stroke, the exhaust cam 22a opens the exhaust valve 22 and burned gas remaining after combustion in the combustion chamber 63 is discharged as exhaust gas to the exhaust branch 31 through the exhaust port 24.

Accordingly, the engine 1 is configured to have the mixture of fresh air and fuel inducted into combustion chambers 63 from the intake device 70. The mixture of fresh air and fuel is combusted inside the combustion chambers 63 and the combustion causes pistons 3 to move reciprocally inside cylinders. The reciprocal motion of the pistons 3 is converted into rotational motion of a crankshaft of the engine 1 by means of connecting rods (not shown).

Overview of Structure of Internal Combustion Engine Intake Device

Figure 2:
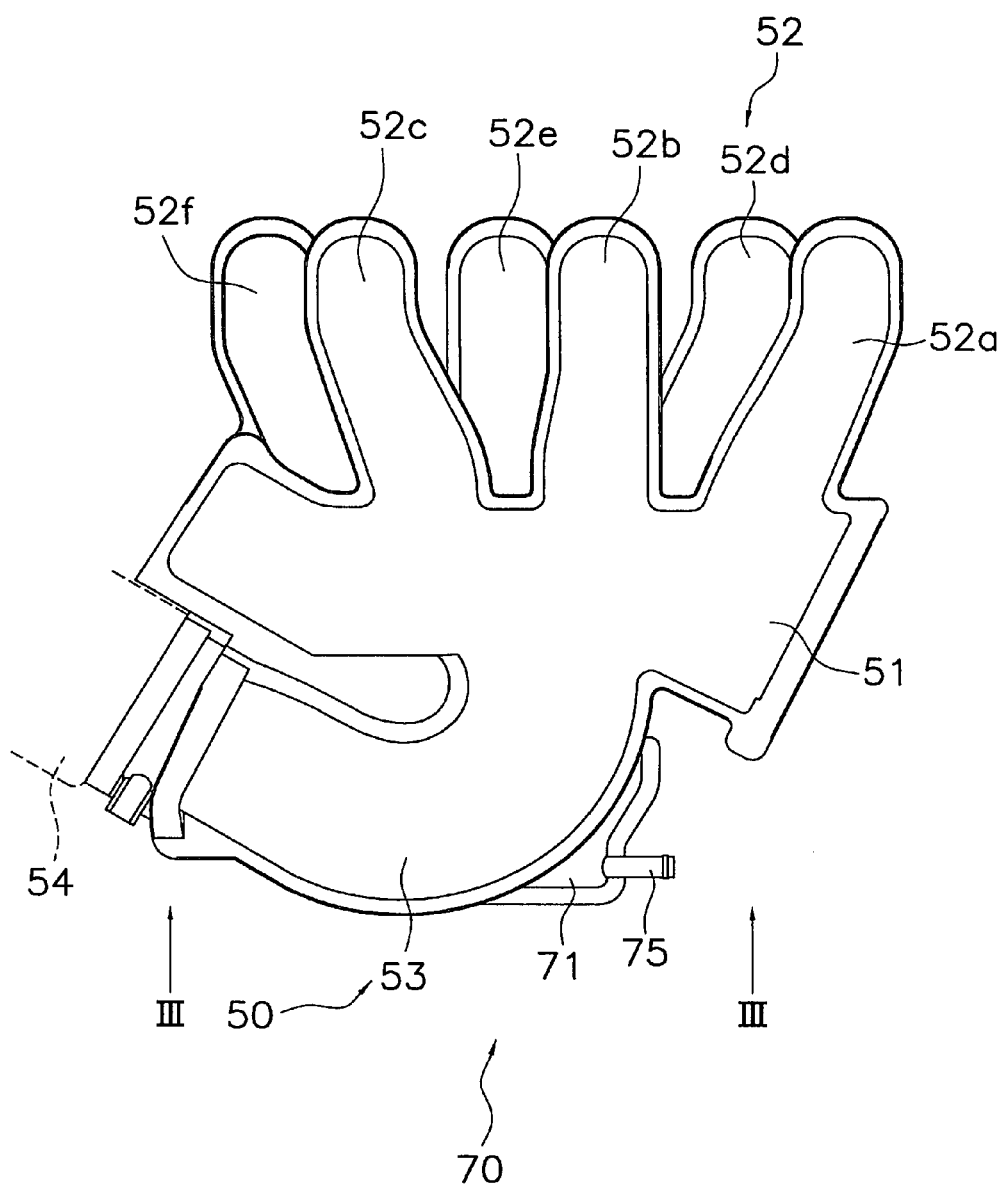
FIG. 2 is a top plan view of the internal combustion engine intake device illustrated in FIG. 1 in accordance with the present invention.
Figure 3:
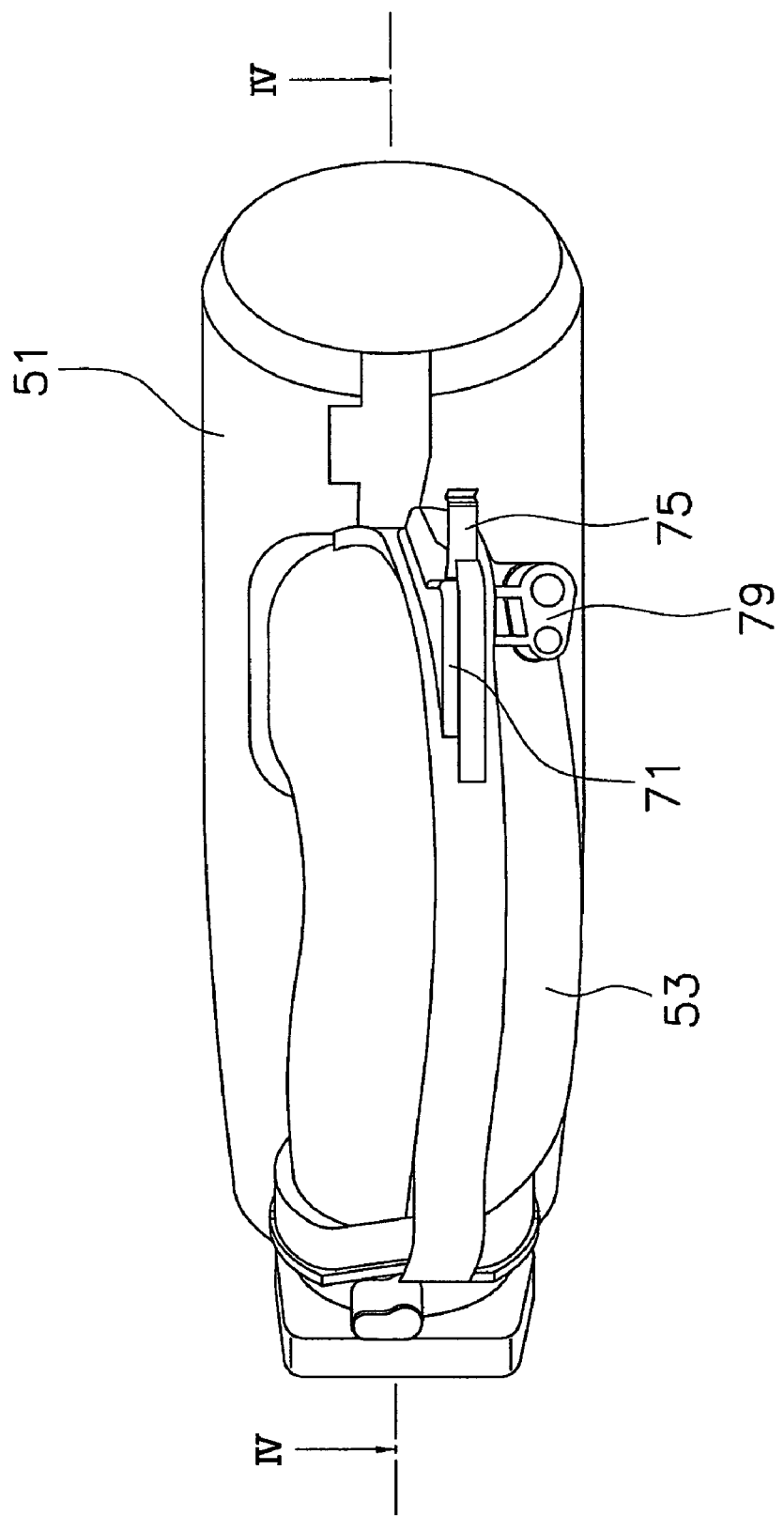
FIG. 3 is a side elevational view of the internal combustion engine intake device taken from the direction of arrows III of FIG. 2 in accordance with the present invention.
Figure 4:
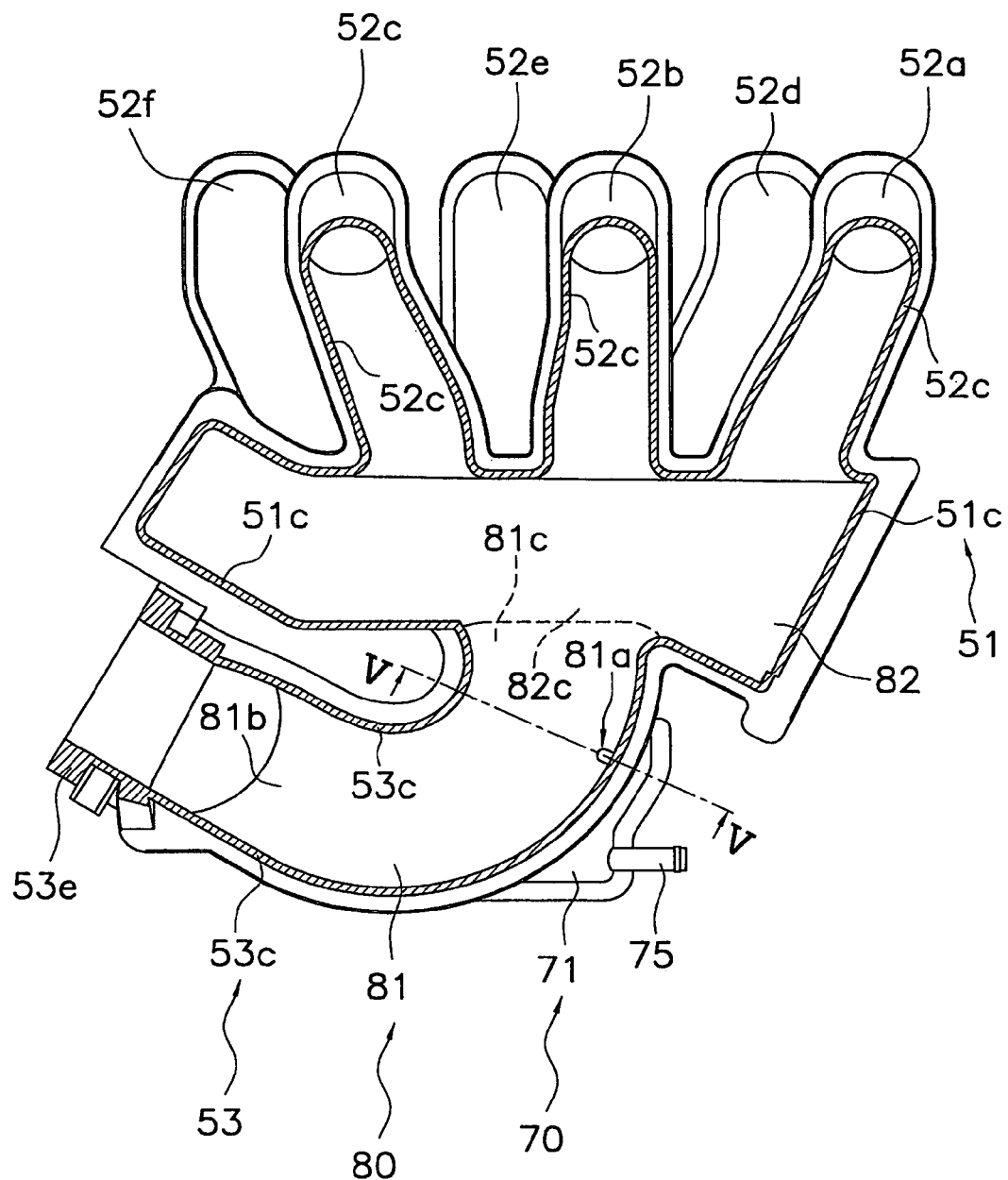
FIG. 4 is a cross sectional view of the internal combustion engine intake device in accordance with the present invention as seen along a section line IV-IV of FIG. 3.

A top plan view of the intake device 70 is shown in FIG. 2. FIG. 3 is a side elevational view of the intake device 70 from the direction of the arrows III of FIG. 2. FIG. 4 is a cross sectional view of the intake device 70 taken along a section line IV-IV of FIG. 3.

Figure 5:
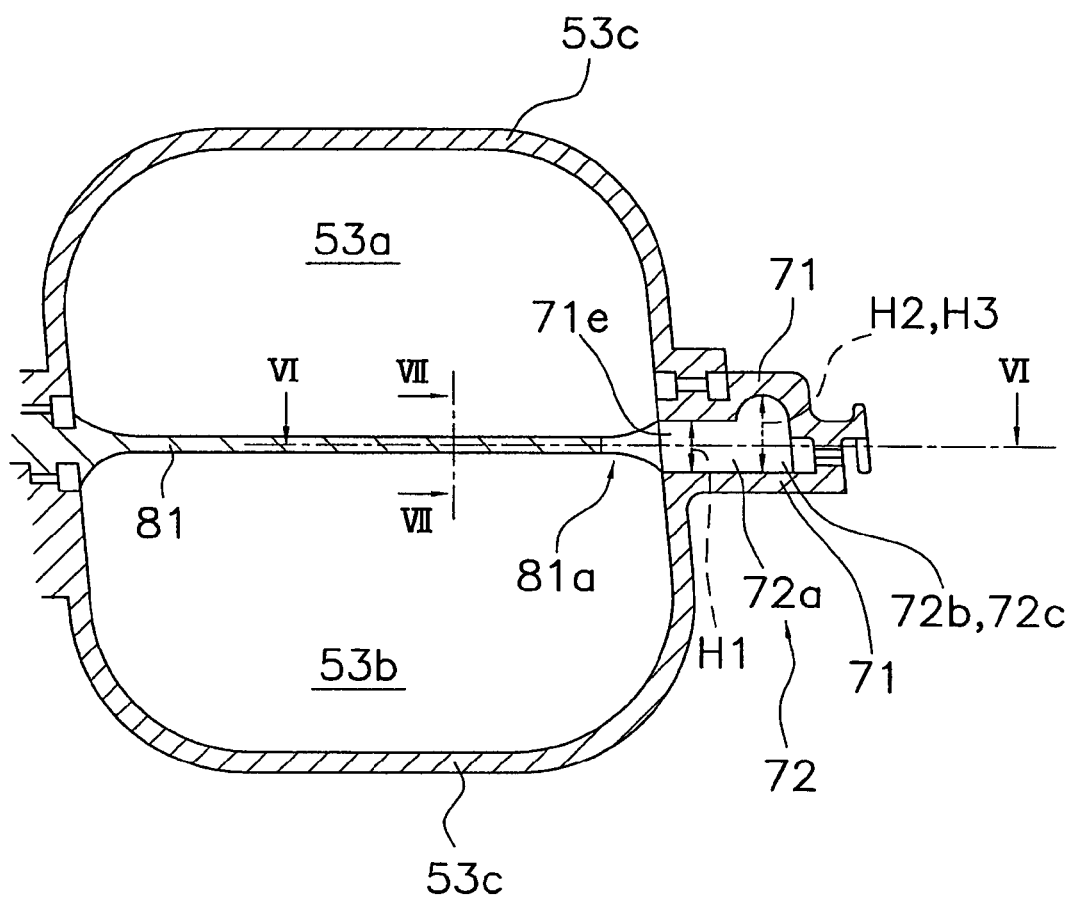
FIG. 5 is a cross sectional view of the internal combustion engine intake device in accordance with the present invention as seen along a section line V-V of FIG. 4.
Figure 6:
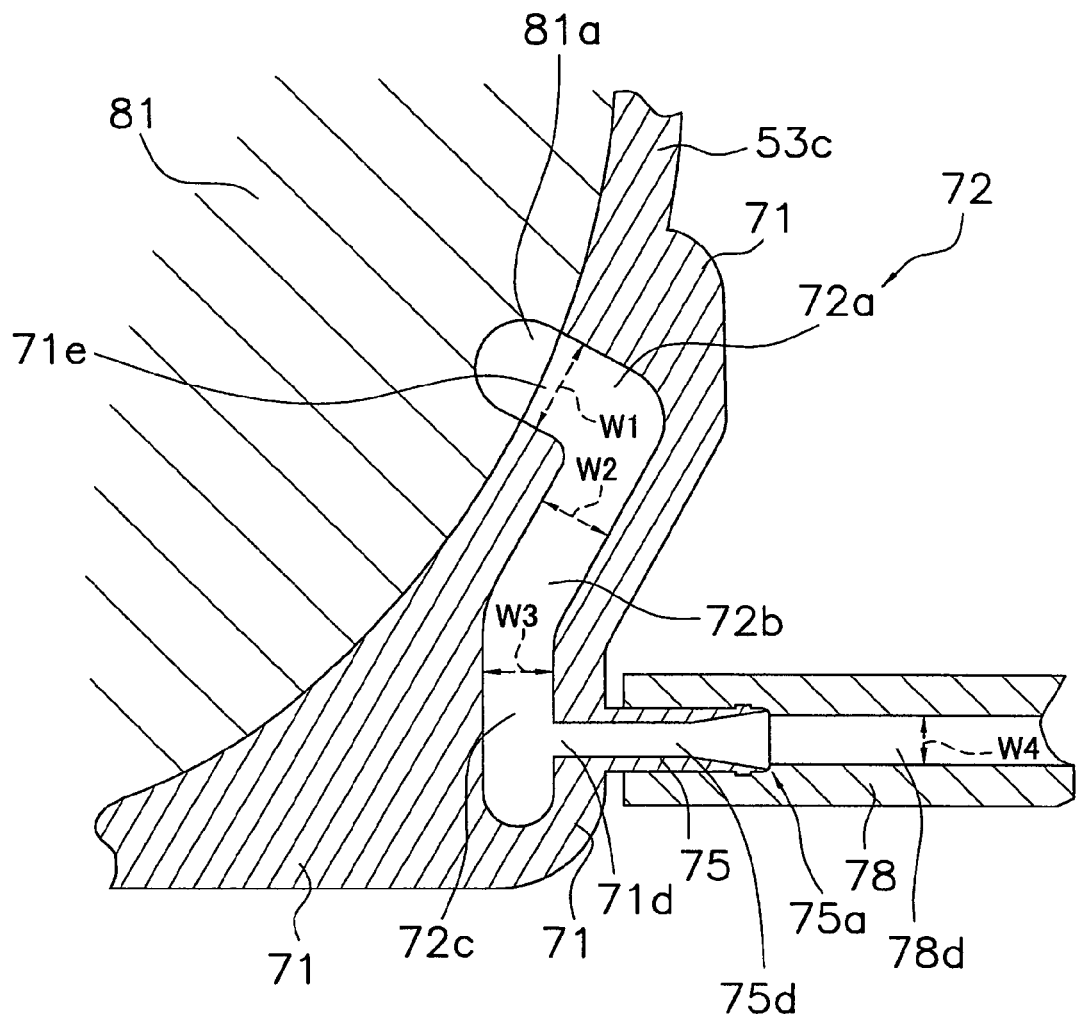
FIG. 6 is a cross sectional view of the internal combustion engine intake device in accordance with the present invention as seen along a section line VI-VI of FIG. 5.

As shown in FIGS. 1, 4, 5 and 6, the intake device 70 basically includes an intake passage 50, a throttle or regulating valve 91 (see FIG. 1), the intake valves 21 (see FIG. 1), a partitioning part 80, a volume chamber 72 (see FIG. 5), a connector (connector part) 75, and a gas introducing pipe 78 (see FIG. 6). The intake passage 50 is the passage through which fresh air flows until it is drawn into the combustion chamber 63. The intake passage 50 basically includes a throttle or regulating chamber 54 (see FIG. 1), an air induction pipe 53, an intake air collector 51, the intake branches 52, and the intake ports 23 (see FIG. 1). The partitioning part 80 comprises a first partitioning plate 81 and a second partitioning plate 82.

The throttle valve 91 is arranged in the throttle chamber 54. The throttle valve 91 is configured and arranged such that the amount of fresh air flowing through the throttle chamber 54 can be changed by changing the opening degree of the throttle valve 91. As a result, the throttle valve 91 is configured and arranged to adjust the quantity of fresh air taken into the combustion chambers 63.

The air induction pipe 53 is provided between the throttle chamber 54 and the intake air collector 51. As shown in FIG. 2, the air induction pipe 53 is curved in a substantially circular arc-like shape and serves as a communication passage between the throttle chamber 54 and the intake air collector 51. As shown in FIG. 5, the space inside the air induction pipe 53 is divided by the first partitioning plate 81 into a first air induction space 53a and a second air induction space 53b such that the first air induction space 53a is disposed above the first partitioning plate 81 and the second air induction space 53b is disposed below the first partitioning plate 81 with respect to the vertical direction of the vehicle. The first air induction space 53a is fluidly communicated with the right-hand cylinder bank and the second air induction space 53b is fluidly communicated with the left-hand cylinder bank. The first partitioning plate 81 is configured and arranged to extend from a position in a vicinity of the throttle valve 91 (i.e., a position near a flange 53e but slightly downstream from the flange 53e) to a position where the intake air collector 51 begins.

As shown in FIGS. 5 and 6, the volume chamber 72 is enclosed by a volume chamber wall and is arranged between the gas introducing pipe 78 (see FIG. 6) and the first and second air induction spaces 53a and 53b. The volume chamber 72 is connected to the gas introducing pipe 78 by the connector 75 (see FIG. 6). As a result, the gas introducing pipe 78 can introduce blow-by gas (first gas) into the first and second air induction spaces 53a and 53b through the connector 75 and the volume chamber 72. The blow-by gas is a gas that contains a higher moisture content and has a higher temperature than the fresh air in the first and second air induction spaces 53a and 53b.

The volume chamber wall 71 is configured and arranged to project outward from the air induction pipe 53. In this way, a volume chamber 72 enclosed by a volume chamber wall 71 can be obtained. By using the volume chamber wall 71 that projects outward from the air induction pipe 53, a higher degree of freedom can be secured with respect to the layout of other members, e.g., a harness bracket mounting boss 79 (see FIG. 3). Additionally, since the harness bracket mounting boss 79 is connected to the volume chamber wall 71, the rigidity of the harness bracket mounting boss 79 can be increased with a comparatively simple structure that is relatively easy to fabricate.

As shown in FIG. 4, the intake air collector 51 is enclosed by a collector wall 51c. The intake air collector 51 is arranged downstream of the throttle valve 91 and the air induction pipe 53. The intake air collector 51 has the form of a generally rectangular box with the air induction pipe 53 being connected thereto in the vicinity of a central portion thereof. The space inside the intake air collector 51 is divided by the second partitioning plate 82 into a first collector space and a second collector space such that the first collector space is disposed above the second partitioning plate 82 and the second collector space is disposed below the second partitioning plate 82 with respect to the vertical direction of the vehicle. The first collector space is fluidly communicated with the right-hand cylinder bank and the second collector space is fluidly communicated with the left-hand cylinder bank.

The second partitioning plate 82 has an end portion 82c that is located close to the air induction pipe 53 and is joined to an end portion 81c of the first partitioning plate 81 that is located close to the intake air collector 51 in a smooth and uninterrupted manner as shown in FIG. 4. Consequently, the first collector space communicates with the first air induction space 53a but does not communicate with the second air induction space 53b. Similarly, the second collector space communicates with the second air induction space 53b but does not communicate with the first air induction space 53a.

As seen in FIG. 4, the intake branches 52 are enclosed by branch walls. The intake branches 52 are arranged between the intake air collector 51 and the cylinder head 20. The intake branches 52 are connected to the opposite side of the intake air collector 51 as the air induction pipe 53. There is one intake branch 52 provided with respect to the intake ports 23 of each of the left and right cylinder banks (FIG. 2 shows an example in which there are six cylinders). More specifically, the intake branches 52 include a first intake branch having a first branch pipe 52a, a second branch pipe 52b, a third branch pipe 52c, and a second intake branch includes a fourth branch pipe 52d, a fifth branch pipe 52e, and a sixth branch pipe 52f. The first branch pipe 52a, the second branch pipe 52b, and the third branch pipe 52c of the first intake branch serve the right-hand cylinder bank and are configured to extend from the first collector space to the respective intake ports 23 of the right-hand bank of cylinders. The fourth branch pipe 52d, the fifth branch pipe 52e, and the sixth branch pipe 52f of the second intake branch serve the left-hand cylinder bank and are configured to extend from the second collector space to the respective intake ports 23 of the left-hand bank of cylinders. One of the intake valves 21 is provided at the downstream end of each intake port 23 and serves to open and close communication between the intake port and the respective combustion chamber 63.

Overview of Operation of Internal Combustion Engine Intake Device

The throttle valve 91 is opened to a prescribed opening degree based on a command from an ECU (not shown). The quantity of fresh air taken in is adjusted according to the opening degree of the throttle valve 91. The fresh air passes through the throttle chamber 54 and into the air induction pipe 53. The fresh air introduced into the air induction pipe 53 is divided into a portion that flows through the first air induction space 53a toward the intake air collector 51 and a portion that flows through the second air induction space 53b toward the intake air collector 51. Consequently, the pulsations of the fresh air in the first air induction space 53a can be offset so as to be out of phase with the pulsations of the fresh air in the second air induction space 53b, thereby enabling resonance to be utilized with respect to the intake of air.

Meanwhile, blow-by gas from the crankcase (not shown) is directed into the gas introducing pipe 78. The blow-by gas passes from the gas introducing pipe 78 through the connector 75 and into the volume chamber 72. At the same time, fresh air is introduced into the volume chamber 72 from the first and second air induction spaces 53a and 53b. Thus, a mixture of fresh air and blow-by gas (hereinafter called "first air mixture") is formed in the volume chamber 72. The first air mixture is introduced into the first and second air induction spaces 53a and 53b from the volume chamber 72.

In the first air induction space 53a, a mixture of fresh air and the first air mixture (hereinafter called "second air mixture") is formed. The second air mixture in the first air induction space 53a is directly introduced into the first collector space, which in turn introduces the second air mixture into the intake ports 23 of the right-hand bank of cylinders via the first branch pipe 52a, the second branch pipe 52b, and the third branch pipe 52c. The second air mixture introduced into the intake ports 23 is directed into the combustion chambers 63 and combusted when the intake valves 21 open.

Similarly, in the second air induction space 53b, the fresh air and the first air mixture mix together to form a second air mixture. The second air mixture in the second air induction space 53b is directly introduced into the second collector space, which in turn introduces the second air mixture into the intake ports 23 of the left-hand bank of cylinders via the fourth branch pipe 52d, the fifth branch pipe 52e, and the sixth branch pipe 52f. The second air mixture introduced into the intake ports 23 is directed into the combustion chambers 63 and combusted when the intake valves 21 open.

Description of Volume Chamber

Figure 7:
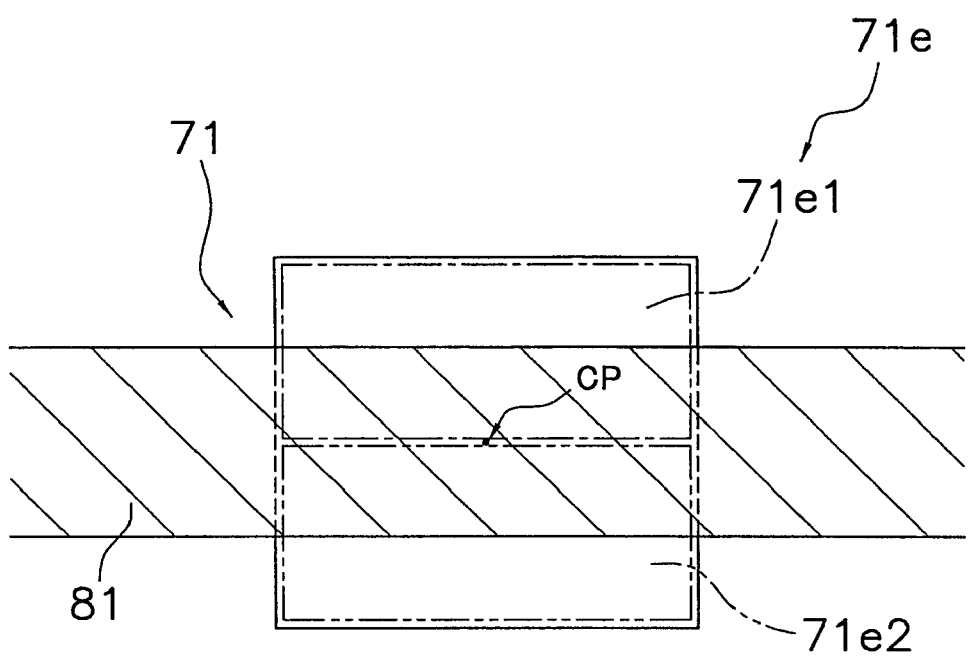
FIG. 7 is a cross sectional view of the internal combustion engine intake device in accordance with the present invention as seen along a section line VII-VII of FIG. 5.

FIG. 5 is a cross sectional view of the intake device 70 taken along the section line V-V of FIG. 4. FIG. 6 is a cross sectional view of the intake device 70 taken along the section line VI-VI of FIG. 5. FIG. 7 is a cross sectional view of the intake device 70 taken along the section line VII-VII of FIG. 5.

The volume chamber 72 is generally shaped like a backwards letter L and is surrounded by the volume chamber wall 71. The volume chamber 72 has a first space 72a, a second space 72b, and a third space 72c. The first space 72a extends away from the first partitioning plate 81 is arranged to be generally coplanar with respect to the first partitioning plate 81. The second space 72b extends from a portion of the first space 72a that is far from the first partitioning plate 81 and follows along the direction of a side face of the first partitioning plate 81. The third space 72c extends from a portion of the second space 72b that is far from the first space 72a and follows along a direction oriented diagonally away from the first partitioning plate 81.

An opening 71e that enables communication between the first space 72a of the volume chamber 72 and the first and second air induction spaces 53a and 53b of the air induction pipe 53 is provided in a portion of the volume chamber wall 71 that faces the first partitioning plate 81. The opening 71e has a generally rectangular cross sectional shape and the cross sectional area thereof is larger than the cross sectional area of the gas introducing pipe 78. More specifically, the cross sectional area of the first space 72a of the volume chamber 72 and the opening 71e have a width W1 and a height H1 with the width W1 being at least 1.5 times larger (preferably at least 2 times larger) than the cross sectional area of the introducing pipe 78 which has a width W4. Also, the cross sectional area of the second space 72b of the volume chamber 72 has a width W2 and a height H2 and the cross sectional area of the third space 72c having a width W3 and a height H3 with the widths W2 and W3 both being larger than the cross sectional area of the first space 72a of the volume chamber 72 having the width W1 and the height H1.

Preferably, a notch 81a is provided in a portion of the first partitioning plate 81 near the opening 71e. The notch 81a ensures good communication of the opening 71e with both the first and second air induction spaces 53a and 53b. As seen in FIG. 7, the first partitioning plate 81 divides or bisects the opening 71e so as to define a first communication surface area 71e1 and a second communication surface area 71e2 that are substantially equal. The first communication surface area 71e1 is the area of the portion 71e1 where the opening 71e directly communicates with the first air induction space 53a. The second communication surface area 71e2 is the area of the portion 71e2 where the opening 71e directly communicates the second air induction space 53b as seen in FIG. 7.

The first partitioning plate 81 is arranged such that it passes nearby the center CP of the area of the opening 71e at an intermediate position along the length of the first partitioning plate 81, which spans from the vicinity of the throttle valve 91 to the intake air collector 51. As a result, the blow-by gas introduced into the volume chamber 72 is distributed substantially evenly to the first and second air induction spaces 53a and 53b through the opening 71e at a middle region or area of the air induction pipe 53.

A communication passage 71d is formed in a portion of the volume chamber wall 71 that is far from the opening 71e. The communication passage 71d communicates between the space 75d inside the connector 75 and the third space 72c of the volume chamber 72. The gas introducing pipe 78 is attached to the connector 75 such that the connector 75 is inserted into the space 78d inside the gas introducing pipe 78. As a result, the space 78d inside the gas introducing pipe 78 communicates with the space 75d inside the connector 75. As a result, the gas introducing pipe 78 can introduce blow-by gas into the first and second air induction spaces 53a and 53b through the connector 75 and the volume chamber 72.

If the cross sectional area of the portion having the width W1 and height H1 is too large, the pulsations of the fresh air in the first air induction space 53a and the pulsations of the fresh air in the second air induction space 53b will weaken. Therefore, it is preferable for the cross sectional area of the portion having the width W1 and the height H1 to be small enough that marked weakening of the pulsations of the fresh air does not occur (e.g., not larger than 2.5 times the cross sectional area of the portion having the width W4).

Description of the Behavior of the Blow by Gas in the Volume Chamber

The blow-by gas introduced into the space 78d inside the gas introducing pipe 78 passes through the space 75d inside the connector 75 and the communication passage 71d and flows into the third space 72c of the volume chamber 72. The blow-by gas introduced into the third space 72c of the volume chamber 72 becomes distributed among the third space 72c, the second space 72b, and the first space 72a.

Since the cross sectional area of the portion having the width W1 is at least 1.5 times larger than the cross sectional area of the portion having the width W4, a portion of the fresh air in the first air induction space 53a and a portion of the fresh air in the second air induction space 53b enter the first space 72a of the volume chamber 72 through the notch 81a and the opening 71e. Since the fresh air from the first and second air induction spaces 53a and 53b enter the first space 72a of the volume chamber 72 while pulsating out of phase with each other, the fresh air mixes rapidly with the blow-by gas in the first space 72a. Thus, a mixture (first air mixture) of fresh air and blow-by gas is formed in the first space 72a. Since the cross sectional area of the portion having the width W2 and the cross sectional area of the portion having the width W3 are larger than the cross sectional area of the portion having the width W1, the first air mixture readily diffuses from the first space 72a to the second space 72b and the third space 72c, further promoting the mixing of the fresh air and blow-by gas. As a result, a portion of the thermal energy of the blow-by gas is absorbed by the fresh air and the temperature of the blow-by gas decreases. In other words, the temperature difference between the blow-by gas and the fresh air in the first and second air induction spaces 53a and 53b decreases.

The first air mixture in the first space 72a, the second space 72b, and the third space 72c of the volume chamber 72 is introduced into the first and second air induction spaces 53a and 53b through the opening 71e. The first air mixture (which contains blow-by gas) is distributed substantially evenly to the first and second air induction spaces 53a and 53b because the first partitioning plate 81 is arranged such that it passes nearby the center CP of the area of the opening 71e at an intermediate position along the length of the air induction pipe 53, and because the first and second communication areas 71e1 and are substantially equal. Additionally, since a first air mixture comprising a mixture of fresh air and blow-by gas is distributed to the first and second air induction spaces 53a and 53b instead of blow-by gas alone, the ?blow-by gas is less likely to be distributed unevenly to the first and second air induction spaces 53a and 53b.

In the illustrated embodiment, the volume chamber 72 is arranged between the gas introducing pipe 78 and the first and second air induction spaces 53a and 53b. Since a portion of fresh air from the first air induction space 53a and a portion of fresh air from the second air induction space 53b mix with the blow-by gas in the volume chamber 72, the temperature difference between the blow-by gas and the fresh air in the first and second air induction spaces 53a and 53b is reduced.

As a result of reducing the temperature difference between the blow-by gas and the fresh air in the first and second air induction spaces 53a and 53b, the occurrence of freezing at the portion of the intake device 70 where the blow-by gas is introduced into the intake passage 50 is suppressed.

If the cross sectional area of the opening were small, high-temperature blow-by gas would be introduced into fresh air at the ambient temperature. Consequently, the freezing would tend to occur at the opening due to the temperature difference between the blow-by gas and the fresh air. Freezing at the opening would, in turn, tend to block the opening.

In the present invention, the cross sectional area of the opening 71e is larger than the cross sectional area of the gas introducing pipe 78. More specifically, the cross sectional area of the opening 71e is at least 1.5 times larger (preferably at least 2 times larger) than the cross sectional area of the gas introducing pipe 78. Consequently, the portion of fresh air from the first air induction space 53a and the portion of fresh air from the second air induction space 53b readily mix with the blow-by gas inside the volume chamber. As a result, the temperature difference between the blow-by gas and the fresh air in the first and second air induction spaces 53a and 53b is reduced and the occurrence of freezing at the portion of the intake device 70 where the blow-by gas is introduced into the intake passage 50 is suppressed.

Furthermore, even if freezing does occur at the opening 71e, the degree to which the opening 71e is blocked will be reduced if the cross sectional area of the opening 71e is larger than the cross sectional area in which freezing occurs.

In the illustrated embodiment, the first partitioning plate 81 is arranged and configured to extend from the vicinity of the throttle valve 91 to the intake air collector 51. As a result, the fresh air in the first air induction space 53a and the fresh air in the second air induction space 53b can be made to undergo an ample degree of pulsation. Furthermore, the pulsations of the fresh air in the first air induction space are out of phase with the pulsations of the second air induction space. Consequently, the portion of fresh air from the first air induction space 53a and the portion of fresh air from the second air induction space 53b readily mix with the blow-by gas inside the volume chamber 72.

In this illustrated embodiment, the first partitioning plate 81 is arranged to pass nearby the center CP of the area of the opening at an intermediate position along the length of the first partitioning plate 81, which spans from the vicinity of the throttle valve 91 to the intake air collector 51. Additionally, the first communication surface area 71e1 and the second communication surface area 71e2 are substantially equal. As a result, the blow-by gas is distributed substantially evenly to the first and second air induction spaces 53a and 53b.

In the embodiment, the gas introducing pipe 78 introduces blow-by gas into the first and second air induction spaces 53a and 53b through the connector 75 and the volume chamber 72. Thus, the manner in which the blow-by gas is distributed is determined by the relative positioning of the first partitioning plate 81 and the volume chamber 72. As a result, the gas introducing pipe 78 can be arranged as appropriate in consideration of the distribution of the blow-by gas without being completely dependent on the position of the first partitioning plate 81.

In the illustrated embodiment, the volume chamber 71 is configured and arranged to project outward from the air induction pipe 53. In this way, a volume chamber 72 enclosed by a volume chamber wall 71 can be obtained. By using a volume chamber wall 71 that projects outward from the air induction pipe 53, a higher degree of freedom can be secured with respect to the layout of other members (e.g., harness bracket mounting boss 79 (see FIG. 3)). Additionally, since the harness bracket mounting boss 79 is connected to the volume chamber wall 71, the rigidity of the harness bracket mounting boss can be increased with a comparatively simple structure that is relatively easy to fabricate.

It is acceptable for the gas introduced from the gas introducing pipe 78 to the first and second air induction spaces 53a and 53b to be EGR gas instead of blow-by gas. EGR gas, too, is a gas that contains moisture and has a higher temperature than the fresh air in the first air induction space and second air induction space. Consequently, freezing tends to occur at the opening 71e.

In this variation, too, the volume chamber 72 is arranged between the gas introducing pipe 78 and the first and second air induction spaces 53a and 53b. Since a portion of fresh air from the first air induction space 53a and a portion of fresh air from the second air induction space 53b mix with the blow-by gas in the volume chamber 72, the temperature difference between the blow-by gas and the fresh air in the first and second air induction spaces 53a and 53b is reduced.

As a result of reducing the temperature difference between the blow-by gas and the fresh air in the first and second air induction spaces 53a and 53b, the occurrence of freezing at the portion of the intake device 70 where the blow-by gas is introduced into the intake passage 50.

Furthermore, the gas introduced to the first and second air induction spaces 53a and 53b from the gas introducing pipe 78 can be any other gas besides blow-by gas or EGR gas so long it is a gas that contains moisture and has a different temperature than the fresh air in the first air induction space 53a and the fresh air in the second air induction space 53b.

The number of cylinders of the internal combustion engine 1 is not limited to six and is not limited to an even number. It is also acceptable for the internal combustion engine 1 to be a flat engine instead of a V-type engine.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An internal combustion engine intake device comprising:
    a regulating chamber having a regulating valve configured and arranged to regulate a quantity of fresh air flowing therethrough;
    an intake air collector fluidly communicating with the regulating chamber at a position downstream of the regulating valve;
    an air induction pipe arranged between the regulating valve and the intake air collector to communicate the fresh air from the regulating chamber to the intake air collector, the air induction pipe including a partitioning part arranged and configured to divide a space inside the air induction pipe into a first air induction space and a second air induction space;
    a gas introducing pipe configured and arranged to introduce a first gas into the first and second air induction spaces, the first gas being different from the fresh air; and
    a volume chamber arranged between the gas introducing pipe and the first and second air induction spaces such that the first gas passes from the gas introducing pipe through the volume chamber and into the first and second air induction spaces.

2. The internal combustion engine intake device as recited in claim 1, wherein
    the volume chamber has an opening that communicates with the first and second air induction spaces, and the cross sectional area of the opening is larger than the cross sectional area of the gas introducing pipe.

3. The internal combustion engine intake device as recited in claim 2, wherein
    the cross sectional area of the opening is at least 1.5 times larger than the cross sectional area of the gas introducing pipe.

4. The internal combustion engine intake device as recited in claim 1, wherein
    the gas introducing pipe is configured and arranged as one of a blow-by gas pipe that introduces blow-by gas as the first gas or an EGR gas pipe that introduces EGR gas as the first gas.

5. The internal combustion engine intake device as recited in claim 1, wherein
    the partitioning part is configured and arranged to extend from a position in a vicinity of the regulating valve to a position substantially coplanar with a boundary plane between a space inside the air induction pipe and a space inside the intake air collector such that pulsations of the fresh air in the first air induction space are out of phase with pulsations of the fresh air in the second air induction space.

6. The internal combustion engine intake device as recited in claim 5, wherein
    the partitioning part is arranged to divide an opening of the volume chamber such that the first gas exiting the opening communicates with both of the first and second air induction spaces, the opening of the volume chamber being disposed at an intermediate position along the air induction pipe.

7. The internal combustion engine intake device as recited in claim 6, wherein
    the opening of the volume chamber has a first communication area defined by an area of communication between the opening and the first air induction space that is substantially equal to a second communication area defined by an area of communication between the opening and the second air induction space.

8. The internal combustion engine intake device as recited in claim 1, further comprising
    a connector part fluidly communicating the volume chamber to the gas introducing pipe such that the first gas from the gas introducing pipe is introduce the first gas into the first and second air introduction spaces through the connector part and the volume chamber.

9. The internal combustion engine intake device as recited in claim 1, wherein
    the volume chamber includes a volume chamber wall with a harness bracket mounting boss that is connected to the volume chamber wall.

10. The internal combustion engine intake device as recited in claim 2, wherein
    the gas introducing pipe is configured and arranged as one of a blow-by gas pipe that introduces blow-by gas as the first gas or an EGR gas pipe that introduces EGR gas as the first gas.

11. The internal combustion engine intake device as recited in claim 2, wherein
    the partitioning part is configured and arranged to extend from a position in a vicinity of the regulating valve to a position substantially coplanar with a boundary plane between a space inside the air induction pipe and a space inside the intake air collector such that pulsations of the fresh air in the first air induction space are out of phase with pulsations of the fresh air in the second air induction space.

12. The internal combustion engine intake device as recited in claim 11, wherein
the partitioning part is arranged to divide the opening of the volume chamber such that the opening communicates with both of the first and second air induction spaces, the opening of the volume chamber being disposed at an intermediate position along the air induction pipe.

13. The internal combustion engine intake device as recited in claim 12, wherein
the opening of the volume chamber has a first communication area defined by an area of communication between the opening and the first air induction space that is substantially equal to a second communication area defined by an area of communication between the opening and the second air induction space.

14. The internal combustion engine intake device as recited in claim 2, further comprising
a connector part fluidly communicating the volume chamber to the gas introducing pipe such that the first gas from the gas introducing pipe is introduce the first gas into the first and second air introduction spaces through the connector part and the volume chamber.

15. The internal combustion engine intake device as recited in claim 2, wherein
the volume chamber includes a volume chamber wall with a harness bracket mounting boss that is connected to the volume chamber wall.

16. The internal combustion engine intake device as recited in claim 1, wherein
the volume chamber includes a volume chamber wall that is a portion of a wall forming the air induction pipe.

17. The internal combustion engine intake device as recited in claim 1, wherein
the intake air collector is divided into a first collector space fluidly communicating with the first air induction space and isolated from the second air induction space, and a second collector space fluidly communicating with the second air induction space and isolated from the first air induction space.

18. The internal combustion engine intake device as recited in claim 1, wherein
the partitioning part includes a notch arranged adjacent an opening of the volume chamber with an edge portion of the notch lying in plane that divides the opening of the volume chamber such that the first gas exiting the opening communicates with both of the first and second air induction spaces.

19. An internal combustion engine intake device comprising:
regulating means for regulating a quantity of fresh air flowing therethrough;
intake air collecting means for collecting intake air into a first collector space and a second collector space;
air induction means for introducing intake air from to an upstream side of the intake air collecting means;
partitioning means for dividing the intake air in the air induction means into first air and second air induction spaces that fluidly communicate with the first and second collector spaces;
gas introducing means for introducing a first gas other than fresh air into the first air and second air induction spaces of the air induction means; and
volume chamber means for communicating the first gas from the gas introducing means to the first and second air induction spaces.

* * * * *